Oct. 7, 1969                   L. KATZ                3,471,761
SWITCHING RELAY MOTOR APPARATUS INCLUDING AN OSCILLATOR
FED WINDING AND AN A.C. FED WINDING
Filed Sept. 30, 1965

INVENTOR.
LEONHARD KATZ
BY Rines and Rines
ATTORNEYS

United States Patent Office 3,471,761
Patented Oct. 7, 1969

3,471,761
SWITCHING RELAY MOTOR APPARATUS INCLUDING AN OSCILLATOR FED WINDING AND AN A.C. FED WINDING
Leonhard Katz, Woburn, Mass., assignor to Astro Dynamics, Inc., Burlington, Mass., a corporation of Massachusetts
Filed Sept. 30, 1965, Ser. No. 491,798
Int. Cl. H02k 29/00
U.S. Cl. 318—138        21 Claims

ABSTRACT OF THE DISCLOSURE

This disclosure deals with switching relay control motor apparatus involving a plurality of geometrically arranged stator windings at least one of which is provided with rectifier means for providing an inherent source of direct-current voltage for the switching-relay-controlled circuit.

---

The present invention relates to switching-relay controlled motor apparatus, being more specifically directed to direct-current-supplied motors of the type described in my prior United States Letters Patent No. 3,098,958 granted July 23, 1963, in which the stator windings are also employed as part of a self-oscillating rotor-frequency-controlling motor oscillator circuit operating with push-pull-connected switching relays, such as solid-state devices of the transistor and silicon-controlled rectifier types.

In such apparatus and other similar circuits, capacitors are generally required to start or initiate the operation; for example, to cause the rotor to commence rotation in the case of the motor above-described upon the application of the direct-current voltage to the oscillator circuit comprising the stator or other windings. The use of such capacitors and the requirement for filtered rectifier power supplies to provide suitable direct-current operating voltage add cost, complexity and bulk to the apparatus.

It is to the solution of the primary problem of eliminating the need for such starting capacitors and/or separate filtered supplies, together with their attendant disadvantages, that the present invention is accordingly directed. In summary, this end is achieved through the application of alternating-current voltage to an appropriately geometrically disposed stator or other fixed winding (such as the application of mains voltage), and/or the use of one or more of such stator or other fixed windings with rectifier means to provide an inherent source of direct-current voltage for the switching-relay-controlled circuit.

A further object of the invention is to provide a new and improved switching-relay-controlled motor apparatus.

Still another object is to provide a novel switching-relay-controlled oscillator circuit of more general utility, also.

Other and further objects will be explained hereinafter and will be more particularly delineated in connection with the appended claims.

Figure 1:
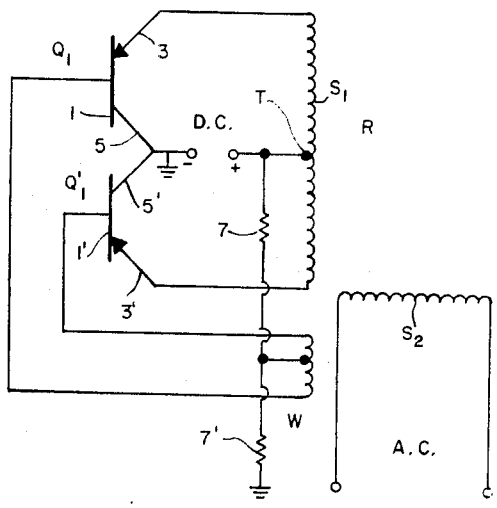
Figure 2:
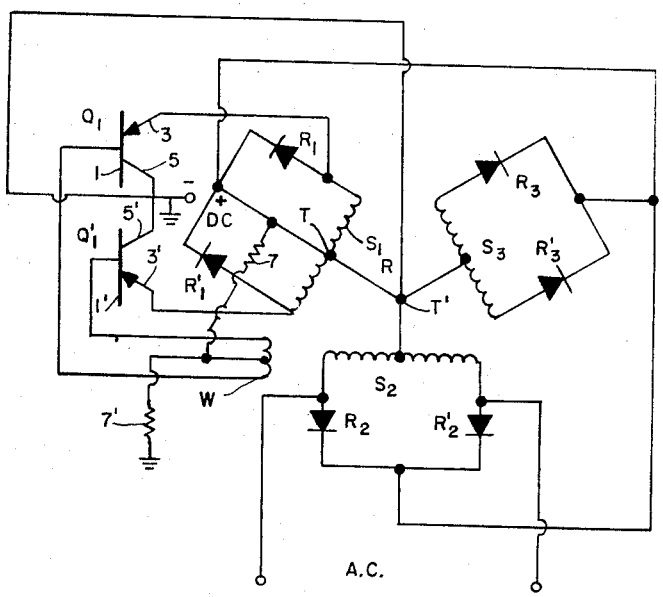

The invention will now be described with reference to the accompanying drawing, FIG. 1 of which is a schematic circuit diagram illustrating the invention as applied to a switching-relay-controlled motor of the above described character; and FIG. 2 is a similar diagram of modification.

Referring to FIG. 1, a motor of the above-mentioned type is shown comprising a first fixed or stator winding $S_1$, connected with a pair of switching relay devices, illustrated as solid-state semi-conductor transistors $Q_1$ and $Q_1'$, having respective base input electrodes 1–1' and output collector electrodes 5–5', and emitter electrodes 3–3'. The connections, as described in the said Letters Patent, are such as to create a push-pull oscillating circuit with the emitter electrodes 3 and 3' connected to opposite terminals of the stator winding $S_1$, and the collector electrodes 5 and 5' connected to a common negative terminal (−) of the direct-current voltage supply D.C. (which may be grounded), the positive terminal (+) of which is connected to a center or intermediate tap T of winding $S_1$. The base electrodes 1 and 1' are connected to opposite terminals of a feedback winding W coupled with the stator winding $S_1$ and intermediately connected through an impedance element 7 to the terminal (+) and also through element 7' to ground. The elements $Q_1$, $Q_1'$, $S_1$ and W thus form a self-oscillating circuit as explained in said Letters Patent.

It has been discovered that if a further fixed or stator winding $S_2$ is appropriately geometrically disposed at a predetermined angle to the winding $S_1$ and is energized with alternating-current voltage of a predetermined frequency, that a rather unusual phenomenon takes place. Assuming, for example, the illustrated ninety-degree angle between the planes or axes of the stator windings $S_1$ and $S_2$, it has been found that the application of the alternating current to $S_2$ causes the oscillator $Q_1$–$Q_2$–$S_1$–W to break into oscillation, starting rotor R (or whatever other load is employed), locking to the frequency of the alternating current A.C. applied to winding $S_2$, but with an electrical phase displacement corresponding to the geometric angle between the windings $S_1$ and $S_2$; i.e. ninety degrees, in the above case.

The frequency of the oscillator circuit may be a multiple (whole or fractional) of the predetermined frequency at winding $S_2$, such a condition generally being described herein as locked to the said predetermined frequency whether the oscillator frequency is the said predetermined frequency or such multiple thereof.

As an example, the circuit of FIG. 1 has been operated with 60-cycle 110-volt mains voltage A.C. transistors $Q_1$–$Q_1'$ of type 2N1546 and a D.C. voltage of 28 volts, with the oscillator locking at the 60-cycle frequency through the ninety-degree phase relationship.

Thus the need for a starting capacitor or capacitors has been obviated and the motor will start, operating synchronously at the frequency of the A.C. or a multiple thereof, as above explained.

If desired, moreover, the D.C. required for the oscillator circuit may be obtained by rectifying the voltage applied to $S_2$, through the provision, for example, of a three-phase system, with substantially equal sixty-degree acute angle orientation of three stator windings $S_1$, $S_2$ and $S_3$, FIG. 2. This obviates the need for filter networks and the like, as well, because the direct-current voltage from a three-phase system, provided at terminals (−) and (+), is substantially ripple-free. A convenient circuit for effecting this result employs rectifiers $R_1$–$R_1'$, $R_2$–$R_2'$ and $R_3$–$R_3'$, connected with opposite terminals of respective windings $S_1$, $S_2$ and $S_3$ and connected as a three-phase bridge rectifier to produce negative voltage at the (−) D.C. terminal and positive at the (+) terminals via common start terminal T' connected to intermediate taps of the windings $S_1$, $S_2$ and $S_3$.

Clearly other geometrical angular orientations (producing corresponding phase shifts and locking without any phase control circuits connected to the stator windings) and other types of rectifier connections may also be employed. The novel features of this apparatus are also clearly useful in other oscillator systems than said motor apparatus.

Further modifications will also occur to those skilled in the art and all such are considered to fall within the spirit and scope of the invention as defined in the appended claims.

What is claimed is:
1. Motor apparatus having, in combination, a rotor, at least a pair of stator windings disposed at a predeter- mined angle to one another and coupled to said rotor, a pair of switching relays connected in push-pull with one winding of the pair of windings to comprise an oscillator circuit, means for supplying direct-current voltage to the oscillator circuit, and means for applying alternating current of a predetermined frequency to the other of the windings and causing the oscillator circuit to be locked to the said predetermined frequency and with oscillations in said one winding of the same electrical phase as the space phase of said one winding relative to the other winding, the last-mentioned means being devoid of a phase control circuit connected to said windings, the said other winding effecting starting of the motor apparatus.

2. Motor apparatus as claimed in claim 1 and in which the windings of the said pair of windings are disposed at a predetermined angle of substantially ninety degrees with respect to one another to provide a phase quadrature system.

3. Motor apparatus as claimed in claim 1 and in which the windings of the said pair of windings are disposed at an acute predetermined angle with respect to one another.

4. Motor apparatus as claimed in claim 3 and in which the said acute angle is substantially sixty degrees.

5. Motor apparatus as claimed in claim 1 and in which the said relays comprise solid-state relays having input and output electrodes, the latter of which are connected in push-pull with the said one winding and with the direct-current voltage supplying means, and the former of which are connected to a feedback winding coupled with the said one winding.

6. Motor apparatus as claimed in claim 5 and in which the said direct-current voltage applying means comprises rectifier means connected with one or more of the said stator windings for producing the said direct-current voltage from the currents therein.

7. Motor apparatus as claimed in claim 6 and in which the said pair of stator windings are two of three stator windings each spaced at substantially equal predetermined angles with respect to the other stator windings.

8. Motor apparatus as claimed in claim 7 and in which each of the said stator windings is connected with rectifier means to produce the said direct-current voltage.

9. Motor apparatus as claimed in claim 7 and in which said equal predetermined angles are substantially sixty degrees to provide a three-phase system.

10. Motor apparatus as claimed in claim 1 and in which the said direct-current voltage applying means comprises rectifier means connected with one or more of the said stator windings for producing the said direct-current voltage from the currents therein.

11. Motor apparatus as claimed in claim 10 and in which the said pair of stator windings are two of three stator windings each at substantially equal predetermined angles with respect to the other stator windings.

12. Motor apparatus as claimed in claim 11 and in which said equal predetermined angles are substantially sixty degrees to provide a three-phase system.

13. Motor apparatus as claimed in claim 11 and in which each of the said stator windings is connected with rectifier means to produce the said direct-current voltage.

14. Apparatus as claimed in claim 13 and in which the said equal predetermined angles are substantially sixty degrees and the said rectifier means form a three-phase rectifier bridge.

15. Apparatus as claimed in claim 1 and in which the frequency of the oscillations of the oscillator circuit is the same as the said predetermined frequency to which it is locked.

16. Apparatus as claimed in claim 1 and in which the frequency of the oscillations of the oscillator circuit is different from that of the said predetermined frequency to which it is locked.

17. Apparatus of the character described having, in combination, at least a pair of windings spaced at a predetermined angle to one another, conductive means coupled to said windings for induction of currents in said conductive means by currents in said windings, a pair of switching relays connected in push-pull with one winding of the pair of windings to comprise an oscillator circuit, means for supplying direct-current voltage to the oscillator circuit, and means for applying alternating current of a predetermined frequency to the other winding and causing the oscillator circuit to be locked to the said predetermined frequency and with oscillations in said one winding of the same electrical phase as the space phase of said one winding relative to the other winding, the last-mentioned means being devoid of a phase control circuit connected to said windings, the said other winding effecting starting of the apparatus.

18. Apparatus as claimed in claim 17 and in which the said relays comprise solid-state relays having input and output electrodes, the latter of which are connected in push-pull with the said one winding and with the direct-current voltage applying means, and the former of which are connected to a feedback winding coupled with the said one winding.

19. Apparatus as claimed in claim 18 and in which the windings of the said pair of windings are at an angle ranging from substantially ninety degrees to an acute angle.

20. Apparatus as claimed in claim 18 and in which the said direct-current voltage applying means comprises rectifier means connected with one or more of the said windings for producing the said direct-current voltage from the currents therein.

21. Apparatus as claimed in claim 20 and in which the windings of the said pair of windings are two of three windings each spaced at substantially sixty degrees with respect to one another to provide a three-phase system, and the said rectifier means form a three-phase rectifier bridge.

References Cited
UNITED STATES PATENTS

| | | | |
|---|---|---|---|
| 3,293,445 | 12/1966 | Levy | 318—138 XR |
| 3,302,083 | 1/1967 | Tanaka et al. | 318—138 |
| 3,309,527 | 3/1967 | Walker | 331—113.1 XR |
| 3,321,687 | 5/1967 | Toth | 318—138 |

ORIS L. RADER, Primary Examiner

G. R. SIMMONS, Assistant Examiner

U.S. Cl. X.R.

331—113; 318—227